Aug. 10, 1943.    H. E. MEYER    2,326,481
BATTERY HOLD-DOWN
Filed July 21, 1941
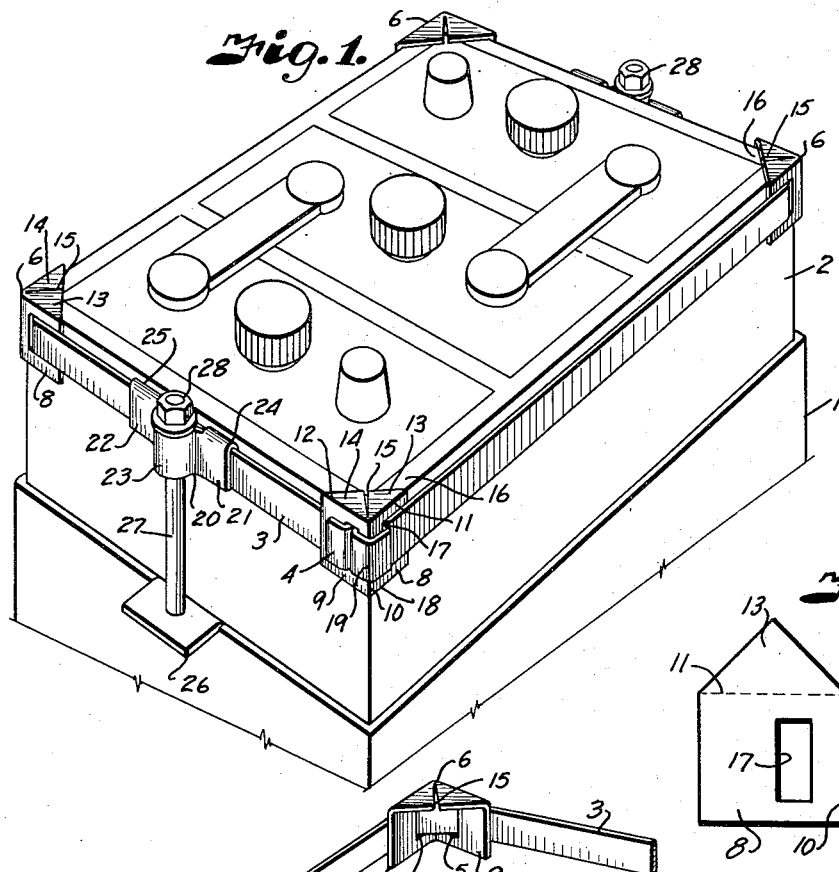
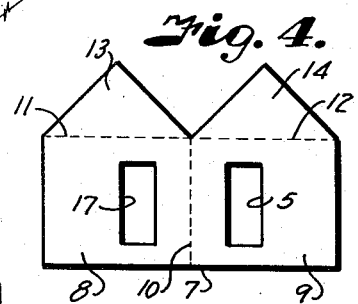
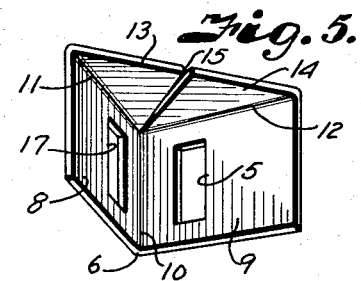
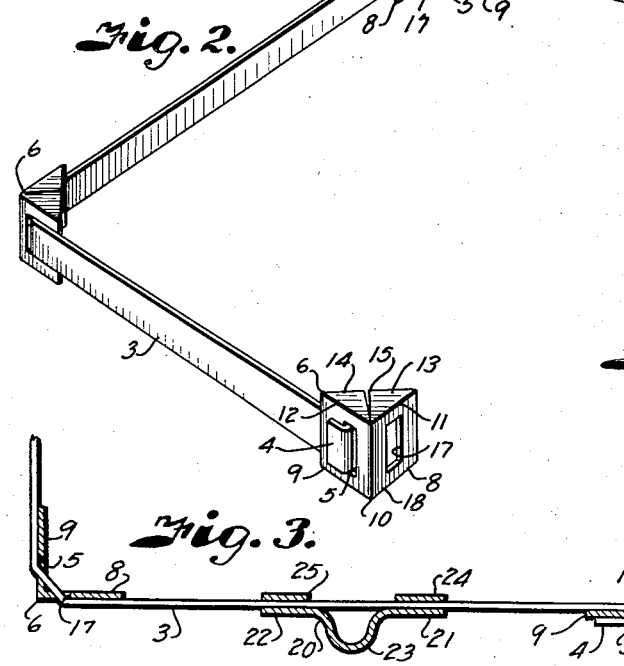
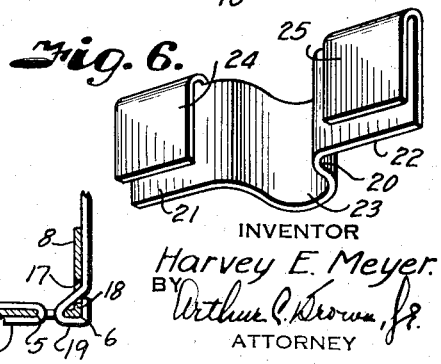
INVENTOR
Harvey E. Meyer.
BY Arthur C. Brown, Jr.
ATTORNEY Patented Aug. 10, 1943

2,326,481

UNITED STATES PATENT OFFICE 2,326,481

BATTERY HOLD-DOWN

Harvey E. Meyer, Kansas City, Mo.

Application July 21, 1941, Serial No. 403,384

12 Claims. (Cl. 180—68.5)

This invention relates to battery hold-downs, and more particularly to a universal hold-down for service on all batteries, especially in automobiles. The principal object of the present invention is to provide a convenient, economical and efficient universal automobile battery hold-down.

Other objects of the invention are to materially simplify battery hold-down structures; to provide a single size battery hold-down capable of being formed, and/or reformed, to fit any size of battery; to provide novel battery corner engaging cleats cooperative with a frame for locking a battery in desired position; to provide combination hook and/or loop elements that may be applies to and removed from the frame relative to various parts of the frame at the will of the operator; to provide a novel lock for separable ends of the frame; and to provide improved elements and arrangements thereof in a universal battery hold-down of the character and for the purposes specified.

In accomplishing these and other objects of the present invention, I have provided improved details of structure, the preferred form of which is illustrated in the accompanying drawing, wherein:

Fig. 1 is a perspective view of a supported battery to which my improved battery hold-down has been applied.

Fig. 2 is a detail perspective view of my improved battery hold-down in disassembled relation to a battery, a part thereof being broken away.

Fig. 3 is a plan view of a portion of my imimproved battery hold-down, the corner cleats and one of the combination hook-loops being shown in horizontal cross-section.

Fig. 4 is a plan view of an illustrative blank from which the corner cleats may be formed.

Fig. 5 is a bottom perspective view of a formed corner cleat.

Fig. 6 is a detail perspective view of a combination hook-loop made in accordance with this invention.

Referring more in detail to the drawing:

1 designates a suitable battery box for supporting the battery 2 in an automobile, for example, not shown.

It is desirable that the battery 2 be held in desired position relative to the box 1 for the purpose of avoiding relative displacement of the battery from its box. To this end, a formable strap 3 is provided, one end 4 of which is passed through a slot 5 or the like, in a battery corner cleat 6, the end 4 of the strap being turned rearwardly upon itself, preferably exteriorly of the cleat 6, as shown in Figs. 1 to 3, for securing the strap to the cleat.

The cleat 6 is preferably formed from the blank 7, Fig. 4, which preferably comprises side walls 8 and 9, defined by bend lines 10, 11 and 12, the arrangement of which is such that when the walls 8 and 9 are bent on the bend line 10 at right angles to each other, the lips 13 and 14 may be folded downwardly on the bend lines 11 and 12 to be arranged in adjacency, as indicated at 15, Fig. 5, to form a cap or cleat 6 engageable over the upper end of a corner 16 of the battery 2.

A cap or cleat 6 is provided for each of the upper corners of the battery 2, it being hereby pointed out that the slot 5 in each cleat is so arranged relative to a cooperative slot 17 in the cooperative wall of the cleat, that the cleat may be slid along the strap 3 when the strap is unformed and when the strap is formed, as shown in Figs. 1 to 3, bending of the strap causes locking of the cleats in desired or placed positions.

The end of the strap opposite the end 4, subsequent to forming the strap to form a battery encircling frame, as shown in Fig. 1, may be passed through the slot 17 of the primary cleat 18, Fig. 1, as well as the slot 5 thereof, after which it may be turned rearwardly upon itself, as indicated at 19, to lock the battery frame and cleat in battery engaging condition.

In order to apply downwardly retentive force on the battery hold-down frame, to, in effect, hold down the battery relative to its supporting box, I preferably provide combination frame-hooks-bolt-loops, as generally indicated at 20 in Fig. 6. These combination frame-hooks-bolt-loops each preferably consists of a single piece of material having wings 21 and 22 arranged in the same plane and having an outwardly directed loop 23 offset relative to the plane of the wings 21 and 22. The upper edges of the wings 21 and 22 are preferably provided with integral hook members 24 and 25, which are bent oppositely from the direction of extension of the loop 23 and downwardly in parallel laterally spaced relation to the wings 21 and 22 to form the hooks, as indicated.

It is apparent that the combination frame-hooks-bolt-loops may be applied to the frame in substantially any position throughout the length thereof and that, when it has been formed, as shown in Fig. 1, the combination hook-loop may be applied to either the sides or ends of the frame throughout the respective lengths thereof as the necessity therefor may occur. For example, the battery support 1 may be provided with oppositely disposed flanges 26 for supporting battery bolts 27, the upper ends of which may seat within the loops 23 of the elements 20. Fastening devices 28 may then be applied to the upper ends of the bolts 27 for applying downward pressure on the loops 23 which in turn, force the hooks 24 and 25 firmly into engagement with the adjacent portions of the battery hold-down frame. The frame in turn, acts on the corner cleats to effectively hold down the battery relative to its box.

In using a universal battery hold-down constructed in accordance with the present invention, an end of the battery frame strap is applied to a corner cleat and other cleats are applied to the strap. The first mentioned corner cleat is applied to a corner of the battery and the next cleat is slid along the frame to a position corresponding to an adjacent corner of the battery, at which time the strap is given a sharp bend to lock the second cleat in battery corner engaging position. The other cleats on the frame strap are applied to the corners and the strap bent to lock the same in position, whereupon the free end of the strap may be passed through the slots in the first named cleat and turned upon itself to lock the battery frame and cleat in battery engaging condition. Combination hook-loops may then be applied to the frame and battery bolts respectively and fastening devices then applied to the battery bolts for clamping the battery hold-down in operative condition.

To remove the battery hold-down from the battery, the fastening devices 28 may merely be removed so that the hold-down may be lifted off the battery. The battery may then be removed from the support to be repaired or replaced and/or the battery hold-down may be applied to another battery of any size after opening the frame and then merely reforming the frame.

It is apparent, therefore, that I have provided an improved, universal automobile battery hold-down of a convenient, economical and efficient nature.

What I claim and desire to secure by Letters Patent is:

1. A battery hold-down comprising a formable strap, constituting a frame, means movably mounted on the strap engageable with corners of a battery, and means mounted on the strap engageable with an anchor for holding the battery in desired relation to a support therefor.

2. In a battery hold-down device, a cleat engageable with a corner of a battery, a formable strap having an end engageable with a portion of said cleat, cleats movably mounted on said strap engageable with other corners of said battery, said strap having another end engageable with said first named cleat to lock the strap and cleats in battery engaging condition, and means on the strap engageable with a portion of a support for the battery to hold the battery in desired relation to said support.

3. In a device of the character described, a strap, a cleat for engaging a corner of a battery comprising a blank having adjacent walls provided with slots, adapted to receive the strap for mounting said cleat thereon for adjustment of the strap about the battery, the edges of said walls having lips foldable into adjacency to form a cap therefor.

4. In a device of the character described, a formable strap, cleats movable on said strap and adapted for engaging corners of a battery, said strap being engageable with said cleats to lock the same in spaced relation, and means engageable with the strap and a portion of a support for the battery respectively for holding the battery in desired relation to the support.

5. In a device of the character described, a cleat engageable with a corner of a battery, a formable strap having an end lockingly engageable with said cleat, additional cleats engageable with other corners of the battery and engageable with said strap in locked relation thereto when the strap is formed about the battery, the other end of the strap being engageable with the first named cleat in locking relation thereto, and at least one combination hook-loop member having a hook engageable with said strap in supported relation thereto and having a loop engageable with a portion of a support for said battery, inter-engagement of the hook with the strap and the loop with said portion retaining said battery in desired relation to the support therefor.

6. In a battery hold-down device, means engageable with a corner of a battery, a formable member engageable with a portion of said means, means movably mounted on said formable member engageable with other corners of said battery, said formable member being engageable with said first named means to lock the same in battery engaging condition, and means on the formable member engageable with a portion of a support for the battery to hold the battery in desired relation to said support.

7. In a device of the character described a formable member, means movable on said formable member and adapted for engaging corners of a battery, said formable member being engageable with said means to lock the same in spaced relation, and means engageable with the formable member and a portion of a support for the battery respectively for holding the battery in desired relation to the support.

8. In a device of the character described, means engageable with a corner of a battery, frame means having an end lockingly engageable with said battery engageable means, means movable over the frame means and engageable with other corners of the battery and engaged with said frame means in locked relation thereto when the same is formed about the battery, the other end of the frame being engaged with the first named battery engageable means in locking relation thereto, and means engageable with said frame means in supported relation thereto, and having means engageable with a portion of a support for said battery, inter-engagement of the said means retaining said battery in desired relation to the support therefor.

9. A battery hold-down comprising a single formable member constituting a frame, means consisting of a cleat formed of a blank having adjacent walls provided with slots movable on the member engageable with a battery, and means on the member cooperative with said first named means for holding the battery in desired relation to a support therefor.

10. In a battery hold-down device, a cleat engageable with a corner of a battery, a formable strap having an end engageable with a portion of said cleat, cleats movably mounted on said strap engageable with other corners of said battery, said strap having another end engageable with said first named cleat to lock the cleats in battery engaging condition, a hook-loop comprising a blank having wings arranged in approximately the same plane, a loop offset from the plane of said wings on one side of said plane, and a hook on an edge of at least one of said wings offset from the plane of said wings on the side thereof opposite said loop adapted for engagement with said strap and with a support for the battery to hold the battery in desired relation to said support.

11. In a battery hold-down device, a formable strap, cleats movably mounted on said strap engageable with the corners of a battery, the ends of said strap being engageable with one of said cleats to lock the frame and cleats in battery engaging condition, a combination hook-loop comprising a blank having wings arranged in approximately the same plane, a loop offset from the plane of said wings on one side of said plane, and hooks on the edges of said wings offset from the plane of said wings on the side thereof opposite said loops adapted for engagement with said strap and with a portion of a support for the battery to hold the battery in desired relation to said support.

12. A battery hold-down comprising a frame, means consisting of a cleat formed of a blank having adjacent walls provided with slots movably mounted on the frame engageable with the corners of a battery, and a combination hook-loop for mounting on the frame and engageable with an anchor for holding the battery in desired relation to a support therefor.

HARVEY E. MEYER.